(12) United States Patent
Song

(10) Patent No.: US 11,074,115 B2
(45) Date of Patent: Jul. 27, 2021

(54) COMPLEX EVENT PROCESSING (CEP) MANAGING METHOD IN M2M SYSTEM AND APPARATUS THEREOF

(71) Applicants: Hyundai Motor Company, Seoul (KR); Kia Motors Corporation, Seoul (KR)

(72) Inventor: Jae Seung Song, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/787,531

(22) Filed: Feb. 11, 2020

(65) Prior Publication Data

US 2020/0257575 A1 Aug. 13, 2020

Related U.S. Application Data

(60) Provisional application No. 62/803,758, filed on Feb. 11, 2019.

(51) Int. Cl.
| | |
|---|---|
| *G06F 9/54* | (2006.01) |
| *G06F 9/50* | (2006.01) |
| *H04L 29/08* | (2006.01) |
| *G06F 9/48* | (2006.01) |

(52) U.S. Cl.
CPC ............ *G06F 9/542* (2013.01); *G06F 9/4843* (2013.01); *G06F 9/5027* (2013.01); *H04L 67/10* (2013.01); *H04L 67/16* (2013.01)

(58) Field of Classification Search
CPC ...................................................... G06F 9/542
USPC ........................................................ 719/318
See application file for complete search history.

(56) References Cited

U.S. PATENT DOCUMENTS

| | | | | | |
|---|---|---|---|---|---|
| 10,129,852 | B2* | 11/2018 | Kim | ..................... | H04W 68/005 |
| 10,250,457 | B2* | 4/2019 | Li | ........................ | H04L 41/5016 |
| 10,638,289 | B2* | 4/2020 | Di Girolamo | .......... | H04L 67/12 |
| 2016/0358143 | A1* | 12/2016 | Foti | ....................... | G06Q 20/145 |
| 2020/0288291 | A1* | 9/2020 | Wang | ...................... | H04L 67/12 |

* cited by examiner

*Primary Examiner* — Andy Ho
(74) *Attorney, Agent, or Firm* — Mintz Levin Cohn Ferris Glovsky and Popeo, P.C.; Peter F. Corless

(57) ABSTRACT

The present invention relates to a complex event processing managing method and apparatus in M2M system. The complex event processing (CEP) managing method according to an embodiment of the present invention includes receiving a CEP request, setting an event processing resource (eventProcessing) responding to the CEP request, and, when an event corresponding to the event processing resource occurs, triggering a corresponding action. In addition, the action is managed by a preset event rule.

14 Claims, 14 Drawing Sheets

Atoms. $[A, B, C, \ldots \subseteq \Sigma_0]$.

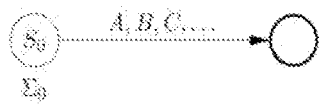

Atoms detect individual events in the input stream of all events that are in the input domain $\Sigma_0$. Here only events in the describable event sets $A \cup B \cup C \cup \ldots$ are matched and cause a transition to a generative state. Other events in $\Sigma_0$ result in failed detection, and events outside $\Sigma_0$ are ignored. The trivial atom $[A \subseteq A]$ is abbreviated as $[A]$.

Negation. $[\neg E \subseteq \Sigma] \triangleq [\Sigma \setminus E \subseteq \Sigma]$. Negation is only short-hand for an atom that matches all events in the input domain $\Sigma$ except for events in the negated describable event set $E$. Note that this semantics differs from the more powerful negation operators found in other event algebras.

Concatenation. $C_1 C_2$.

The concatenation operator detects a composite event matching expression $C_1$ with a timestamp that *weakly* follows the timestamp of a composite event matching $C_2$. The detection automaton for concatenation is constructed by connecting the generative state of $C_1$ with a weak $\epsilon$-transition to the initial state of $C_2$.

Sequence. $C_1; C_2$.

The sequence operator detects an event of type $C_1$ *strongly* followed by an event of type $C_2$. Unlike concatenation, this means that the interval timestamps of the events matching $C_1$ and $C_2$ must not overlap. The construction of the sequence detection automaton uses a strong transition for the $\epsilon$-transition between the two sub-automata.

FIG. 15 (cont'd)

Iteration. $C_1^*$.

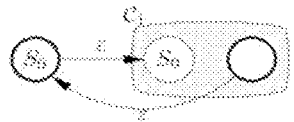

Any number of occurrences of $C_1$ are matched by the iteration operator. Its detection automaton creates a loop from the generative state of $C_1$ back to its initial state. If $C_1$ receives an event that causes it to fail, then the composite expression $C_1^*$ also fails.

Alternation. $C_1 | C_2$.

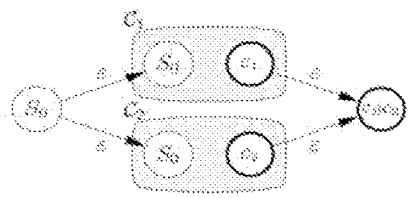

This composite event expression matches if either $C_1$ or $C_2$ is detected. The new automaton has an initial and a generative state with ε-transitions to both of the two sub-automata introducing nondeterministic behaviour.

Timing. $(C_1, C_2)_{T_1 = tspec}$.

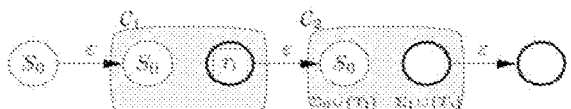

Timing relationships between composite events are supported by the timing operator that can detect event combinations within, or not within, a given time interval. This operator generates an event of type $T_1$ at the relative or absolute time specification *tspec* after a composite event of type $C_1$ has been detected. The second expression $C_2$ may then use $T_1$ in its specification for atoms and input domains. Since time events are only locally visible, automata $C_1$ and $C_2$ must reside on the same node.

Parallelisation. $C_1 \| C_2$.

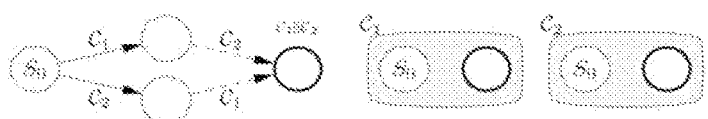

The final operator is parallelisation, which allows detection of two composite events $C_1$ and $C_2$ in parallel, only succeeding if both are detected. Unlike alternation, any interleaving of the two composite events is supported. The detection automaton for parallelisation is constructed by creating a new automaton that uses the composite events detected by $C_1$ and $C_2$ for its transitions.

COMPLEX EVENT PROCESSING (CEP) MANAGING METHOD IN M2M SYSTEM AND APPARATUS THEREOF

CROSS REFERENCE TO RELATED APPLICATION

The present application claims priority to U.S. provisional No. 62/803,758, filed Feb. 11, 2019, the entire contents of which are incorporated herein for all purposes by this reference.

BACKGROUND OF THE INVENTION

Field of the Invention

The present invention relates to an M2M system. More particularly, the present invention relates to a complex event processing managing method and apparatus in an M2M system.

Description of the Related Art

Recently, introduction of M2M (Machine-to-Machine) system has become active. An M2M communication may refer to a communication carried out between machines without human intervention. M2M may refer to MTC (Machine Type Communication), IoT (Internet of Things) or D2D (Device-to-Device). However, in the following description, M2M is referred to as unity for convenience of explanation, but the present invention is not limited thereto. A terminal used for M2M communication may be an M2M terminal (M2M device). An M2M terminal may generally be a device having low mobility while transmitting a small amount of data. Herein, the M2M terminal may be used in connection with an M2M server that centrally stores and manages inter-machine communication information.

In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, API specifications, security solutions and interoperability. The specifications of the oneM2M standardization organization provide a framework to support a variety of applications and services such as smart cities, smart grids, connected cars, home automation, security and health.

SUMMARY OF THE INVENTION

The present invention may provide a complex event processing (CEP) managing method and apparatus.

The present invention may provide a complex event processing managing and apparatus in an M2M system.

The prevent invention may provide a method and apparatus for efficiently managing complex event by newly defining a resource for complex event processing in an M2M system.

According to an embodiment of the present invention, a complex event processing (CEP) managing method includes receiving a CEP request, setting an event processing resource (eventProcessing) responding to the CEP request, and, when an event corresponding to the event processing resource occurs, triggering a corresponding action. In addition, the action is managed by a preset event rule.

In addition, according to a CEP managing method of the prevent invention, the event processing resource includes an event engine resource (cepEngine).

In addition, according to a CEP managing method of the present invention, the event rule is defined by an event rule resource (eventRules) in the event processing resource.

In addition, a CEP managing method of the present invention, for the action trigger, includes a CEP-IPE resource including trigger action information based on CEP.

In addition, according to a CEP managing method of the present invention, the CEP-IPE resource includes a CEP event resource (cepEvents) and a CEP action resource (cepActions).

According to another embodiment of the present invention, a complex event processing (CEP) managing method includes, when CEP management is requested, setting a CEP rule, when an event is notified, confirming whether or not the event matches the CEP rule, and when the matching event occurs, triggering a CEP action.

According to an embodiment of the present invention, a complex event processing (CEP) managing apparatus includes at least one or more processes and at least one or more memories connected to the at least one or more processes. In addition, the at least one or more processes, which are connected to the at least one or more memories in an operable manner and execute a program command stored in the at least one or more memories, receive a CEP request, set an event processing resource (eventProcessing) responding to the CEP request, and, when an event corresponding to the event processing resource occurs, trigger a corresponding action. Herein, the action is managed by a preset event rule.

In addition, according to a CEP managing apparatus of the present invention, the at least one or more processes set an event engine resource (cepEngine) in the event processing resource.

In addition, according to a CEP managing apparatus of the present invention, the at least one or more processes set an event rule resource (eventRules) in the event processing resource and hence manage the event rule.

In addition, according to a CEP managing apparatus of the present invention, the at least one or more processes set a CEP-IPE resource including trigger action information based on CEP for the action trigger.

In addition, according to a CEP managing apparatus, the at least one or more processes set a CEP event resource (cepEventt) and a CEP action resource (cepActions) in the CEP-IPE resource.

According to an embodiment of the present invention, an M2M device for CEP (Complex Event Processing) management includes an application entity (AE) node requesting CEP management, a common service entity (CSE) node setting a CEP resource responding to the CEP management request, and a CEP-IPE node triggering a corresponding action, when an event corresponding to the CEP resource occurs. In addition, the common service entity (CES) performs an action triggered from CEP-IPE node.

In addition, according to an M2M device of the present invention, the CEP resource includes an event processing resource (eventProcessing) and an event engine resource (cepEngine).

In addition, according to an M2M device of the present invention, the CEP resource, for the action trigger, includes a CEP-IPE resource including trigger action information based on CEP.

In addition, according to an M2M device of the present invention, the CEP-IPE resource includes a CEP event resource (cepEvents) and a CEP action resource (cepActions).

According to the present invention, an efficient CEP managing method and apparatus may be provided.

According to the present invention, since a resource for CEP management can be defined and utilized, standardized CEP management in an M2M system becomes possible.

Effects obtained in the present invention are not limited to the above-mentioned effects, and other effects not mentioned above may be clearly understood by those skilled in the art from the following description.

BRIEF DESCRIPTION OF THE DRAWINGS

FIG. 15 shows an example of operators for CEP management according to the present invention.

DETAILED DESCRIPTION OF THE INVENTION

Figure 1:
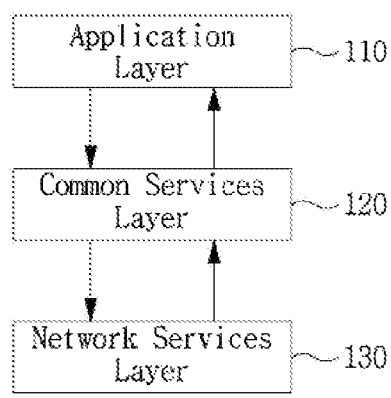
FIG. 1 is a view illustrating a layered structure of an M2M system according to the present invention.

Hereinafter, an exemplary embodiment of the present invention will be described with reference to the accompanying drawings for those skilled in the art to easily implement the present invention. However, the present invention may be embodied in many different forms and is not limited to the embodiments described herein.

In the present invention, it will be understood that although the terms first and second are used herein to describe various elements, these elements should not be limited by these terms. Thus, within the scope of this disclosure, a first component in one embodiment may be referred as a second component in another embodiment, and similarly, a second component in one embodiment may be referred as a second component in another embodiment.

In the present invention, if a component were described as "connected", "coupled", or "inked" to another component, they may mean the components are not only directly "connected", "coupled", or "linked", but also are indirectly "connected", "coupled", or "linked" via one or more additional components. In addition, it will be understood that the terms "comprises", "comprising", or "includes" or "including" when used in this specification, specify the presence of one or more other components, but do not preclude the presence or addition of one or more other components unless defined to the contrary.

In the present invention, the components that are distinguished from each other are intended to clearly describe the respective features, and do not necessarily mean that the components are separated. That is, a plurality of components may be integrated into one hardware or software unit, or one component may be distributed into a plurality of hardware or software units. Accordingly, such integrated or distributed embodiments are included within the scope of the present invention, unless otherwise noted.

In the present invention, the components described in the various embodiments are not necessarily essential components, and some may be optional components. Accordingly, embodiments consisting of a subset of the components described in one embodiment are also included in the scope of the present invention. In addition, embodiments including other components in addition to the components described in the various embodiments are also included in the scope of the present invention.

In the following description of the at least one embodiment, a detailed description of known functions and configurations incorporated herein will be omitted for the purpose of clarity and for brevity. In addition, parts not related to the description of the present invention in the drawings are omitted, and like parts are denoted by similar reference numerals.

In addition, the present specification describes a network based on M2M communication, and a work in M2M communication network may be performed in a process of network control and data transmission in a system managing the communication network.

In addition, in the present specification, an M2M terminal may be a terminal performing M2M communication. However, in consideration of backward compatibility, it may be a terminal operating in a wireless communication system. In other words, an M2M terminal may mean a terminal operating based on M2M communication network but is not limited thereto. An M2M terminal may operate based on another wireless communication network and is not limited to the embodiment described above.

In addition, an M2M terminal may be fixed or have mobility. In addition, an M2M server refers to a server for M2M communication and may be a fixed station or a mobile station.

In addition, in the present specification, an entity may refer to hardware like M2M device, M2M gateway and M2M server. In addition, for example, an entity may be used to refer to software configuration in a layered structure of M2M system and is not limited to the embodiment described above.

In addition, for example, the present invention mainly describes an M2M system but is not solely applied thereto. Accordingly, the technical idea disclosed by the present invention may be applied to another communication system in the same manner.

In addition, an M2M server may be a server that performs communication with an M2M terminal or another M2M server. In addition, an M2M gateway may serve as a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

FIG. 1 is a view illustrating a layered structure of an M2M system.

Referring to FIG. 1, a layered structure of an M2M system may consist of an application layer 110, a common services layer 120 and a network services layer 130. Herein, an application layer 110 may be a layer operating based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

A common services layer 120 may be a layer for a common service function. For example, a common services layer 120 may be a layer for providing a common service like data management, device management, M2M service subscription management and location service. For example, an entity operating based on a common services layer 120 may be a common service entity (CSE).

A network services layer 130 may provide a common services layer 120 with services such as device management, location service and device triggering. Herein, an entity operating based on a network layer 130 may be a network service entity (NSE).

Figure 2:
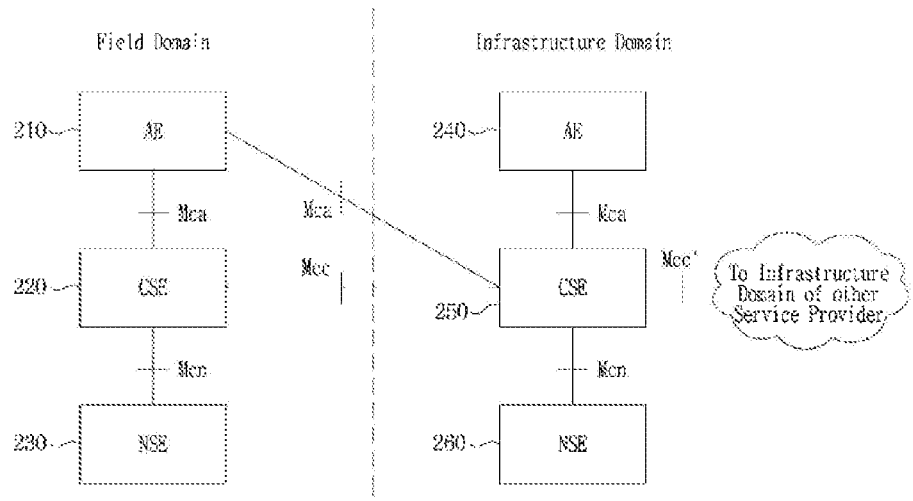
FIG. 2 is a view illustrating a reference point according to the present invention.

FIG. 2 is a view illustrating an M2M system structure.

Referring to FIG. 2, an M2M system structure may be divided into a field domain and an infrastructure domain. Herein, in each domain, each of the entities may perform communication through a reference point. For example, a reference point may indicate a communication flow between each entity. Here, referring to FIG. 2, Mca reference point between AE 210, 240 and CSE 220, 250, Mcc reference point between different CSEs 220, 250, and Mcn reference point between CSE 220, 250 and NSE 230, 260 may be set.

Figure 3:
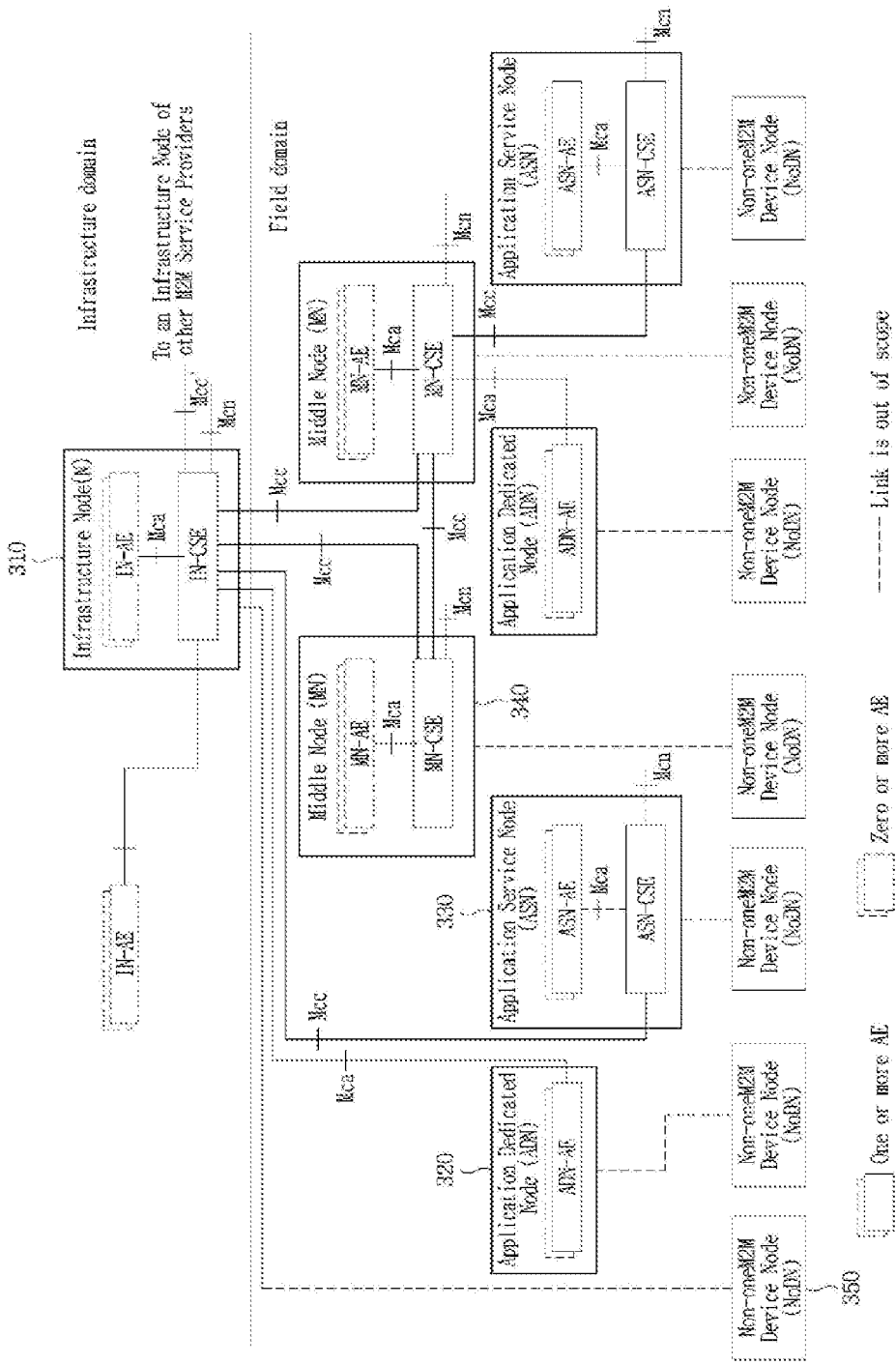
FIG. 3 is a view illustrating each node according to the present invention.

FIG. 3 is a view illustrating the setting of an M2M system structure.

Referring to FIG. 3, an infrastructure domain of a specific M2M service provider may provide a specific infrastructure node (IN) 310. Herein, the CSE of the IN may perform communication based on Mca reference point and the AE of another infrastructure node. In this case, one IN may be set for each M2M service provider. In other words, the IN may be a node that performs communication with the M2M terminal of another infrastructure based on an infrastructure structure. In addition, for example, the concept of a node may be a logical entity or may be a software configuration.

Next, an application dedicated node (ADN) 320 may be a node including at least one AE but not CSE. Here, an ADN may be set in the field domain. In other words, an ADN may be a dedicated node for AE. For example, an ADN may be a node that is set in an M2M terminal in hardware. In addition, an application service node (ASN) 330 may be a node including one CSE and at least one or more AEs. ASN may be set in the field domain. In other words, it may be a node including AE and CSE. In this case, an ASN may be a node connected to an IN. For example, an ASN may be a node that is set in an M2M terminal in hardware.

In addition, a middle node (MN) 340 may be a node including a CSE and including zero or more AEs. At this time, the MN may be set in the field domain. An MN may be connected to another MN or IN based on a reference point. In addition, for example, an MN may be set in an M2M gateway in hardware.

In addition, for example, a non-M2M terminal node 350 (Non-M2M device node, NoDN) is a node that does not include M2M entities. It may be a node that performs management of or collaboration with an M2M system.

Figure 4:
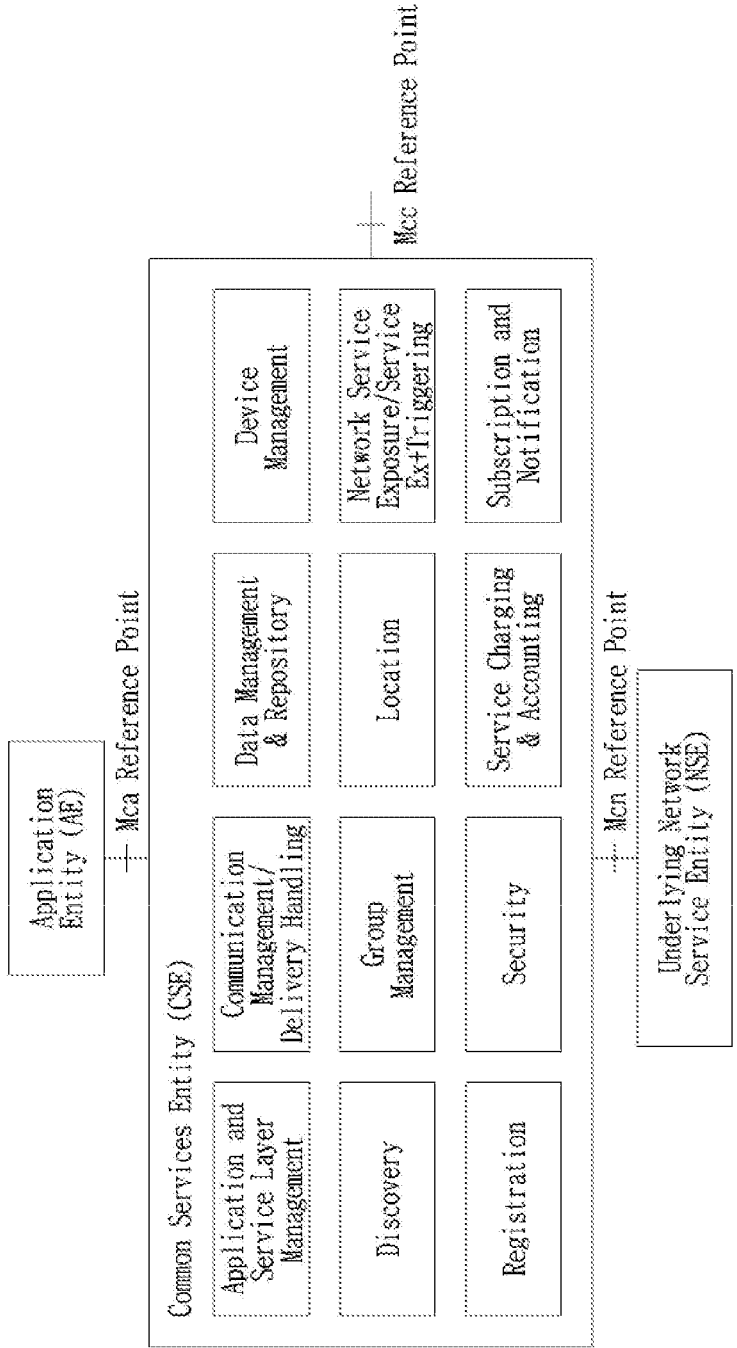
FIG. 4 is a view illustrating a common service function according to the present invention.

FIG. 4 is a view illustrating a common service function. Referring to FIG. 4, a CSE may provide common service functions. For example, a common service function may provide at least one or more functions among application and service layer management, communication management and delivery handling, data management and repository, device management, discovery, group management, location, network service exposure/service execution and triggering, registration, security, service charging and accounting, service session management, and subscription/notification. At this time, M2M terminals may operate based on a common service function. In addition, a common service function may be possible in other embodiments and is not limited to the embodiment described above.

In addition, for example, at least any one or more among an M2M platform, an M2M gateway, an M2M device and an application entity may be included in an M2M system. For example, an IN may serve as an M2M platform, and an MN may serve as an M2M gateway. In addition, an ASN or ADN may be an M2M device and may operate based on the above description. In addition, for example, a CSE is used as a common functional element of an M2M system and may perform a common function, as described above. In this case, the CSE may be included in an ASN, which is used as an M2M platform, an M2M gateway and an M2M device, in order to implement a corresponding function, as described above. In addition, for example, an AE may be included in at least any one among an M2M platform, an M2M gateway, an ASN, and an AND. In addition, for example, an AE may be used alone and is not limited to the embodiment described above.

Herein, for example, a hosting CSE (Hosting Common-Service Entity, H-CSE) may be an entity holding a resource or an attribute, and a registrar common service entity (R-CSE) may be a CSE with a terminal (or M2M terminal) registered therein. In addition, for example, a terminal may be at least one among ADN, ASN and MN. In addition, for example, R-CSE and H-CSE may be at least any one or more among ASN, MN and IN.

For example, a terminal may acquire a resource from a H-CSE through a R-CSE. Meanwhile, a resource may be expressed based on an object operating in an M2M system. For example, a resource may be defined based on terminal operation information for a specific service and may be indicated based on CRUD (Create/Retrieve/Update/Delete). For a more particular example, a terminal (or AE) may obtain attribute information of a resource and a target resource from a H-CSE through a R-CSE. Here, as described above, the H-CSE may provide the AE with the resource and the attribute information thereof for a specific service. Accordingly, for example, an H-CSE may be a resource server for a special service. In addition, for example, a resource server may be a vehicle driving server or a vehicle management server. In other words, a terminal may obtain information for a specific service from a server on the basis of a resource and may operate based on the information. Meanwhile, for example, a CSE in an M2M system may include a transceiver, a processor, and a memory. Based on this, the CSE may transmit and receive a data packet to and from other nodes to process the data packet. A specific apparatus configuration will be described later.

In addition, for example, a resource may store related information through a container and may share data with another entity. Herein, the content instance may be a child resource. In addition, for example, the attribute information of each resource may be a specific description for the resource. Herein, the resource attribute information may store attribute data of the resource.

Based on the above description, a terminal (AE) may obtain a specific resource from an H-CSE through a R-CSE. Herein, the resource may include attribute information as target attribute information. The terminal may perform an operation for a specific service based on the obtained resource and attribute information.

Figure 5:
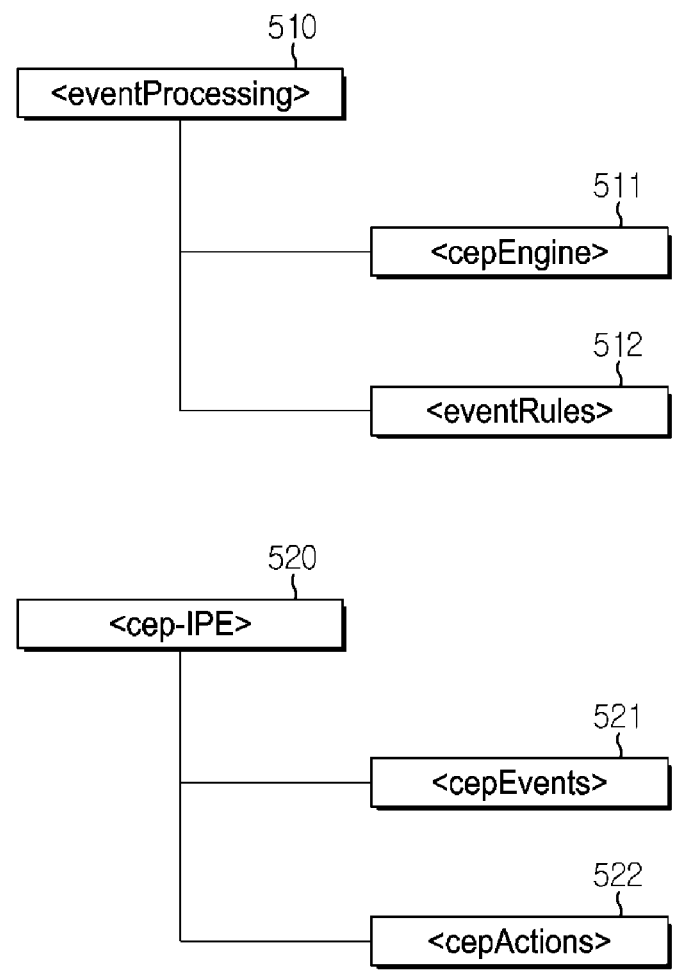
FIG. 5 shows an example of a resource for complex event processing (CEP) according to the present invention.

FIG. 5 shows examples of resources for complex event processing (CEP) according to the present invention.

In this regard, in an M2M system, a CEP technique is used to find an intended event from a huge amount of data and to trigger a specific action therefrom. However, in a current M2M system, a method for efficiently processing CEP is not determined. Accordingly, there is no unified standard method for CEP processing in an actual M2M system.

Referring to FIG. 5, the present invention proposes <eventProcessing> 510 and <cep-IPE> 520 as resources for CEP processing. In this regard, the resource <eventProcessing> 510 may be implemented as attribute information. Herein, the resource <eventProcessing> 510 may include at least one or more pieces of attribute information corresponding to Table 1 below.

TABLE 1

A set of events (E1, E2, E3, ... En)
Corresponding operations (O1, O2, O3, ... On-1)
A CEP query (EPL)
Mapping between Objects and Resources
Linked actions In addition, the <eventProcessing> 510 may include <cepEngine> 511 and <eventRules> 512. More particularly, the resource <cepEngine> 511 may include, for example, the name of the corresponding CEP engine, the point of access (PoA) of CEP, the type of CEP engine, a supported event processing language (EPL) and a link to the corresponding CEP-IPE.

In addition, the resource <eventRules> 512 may include, for example, the number of created event rules, a target CEP, an EPL query, monitoring events, target actions <action> and operation function (operator).

In this regard, the <cep-IPE> 520 may include the resource <cepEvents> 521 and the resource <cepActions> 522. Herein, the <cep-IPE> 520 may include a link to the corresponding CEP <cepEngine>, the number of managing event rules, an executing EPL (Execute EPL), EPL creation based on event rules (Form EPL based on eventRules), and trigger action information based on the CEP (Trigger <action> based on response from the CEP). For example, the <cep-IPE> 520 may correspond to an interworking function performing EPL transform between the above-mentioned IN-CSE and CEP.

In addition, for example, if a service provider (for example, IN-AE) wants to create a new application using CEP, the above-mentioned resources need to be created first. Accordingly, as the resources use a defined M2M system platform, the service provider (for example, IN-AE) may efficiently provide a CEP service.

Figure 6:
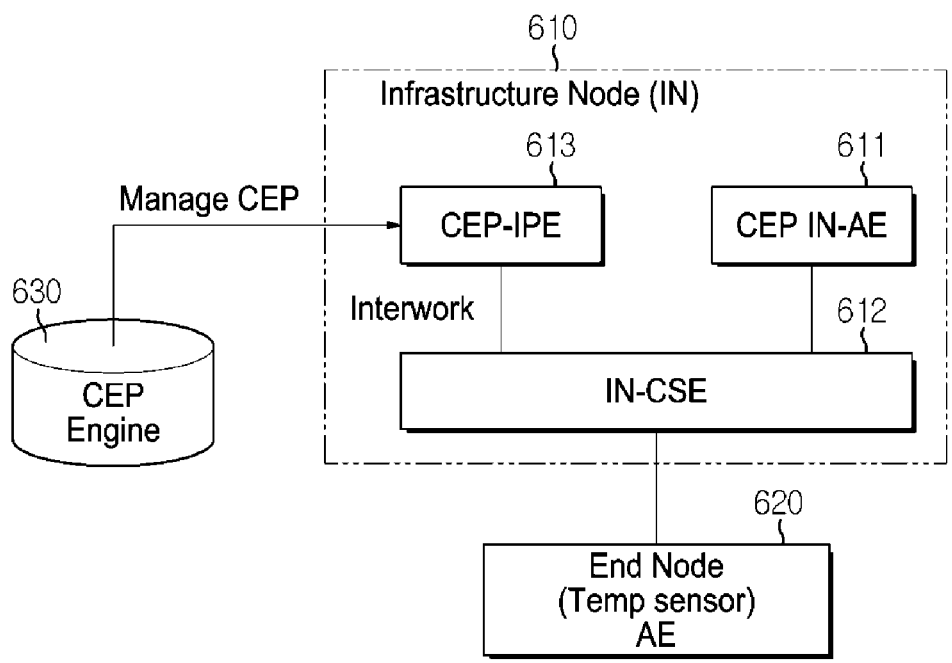
FIG. 6 and FIG. 7 shows examples of M2M system enabling CEP management according to the present invention.
Figure 7:
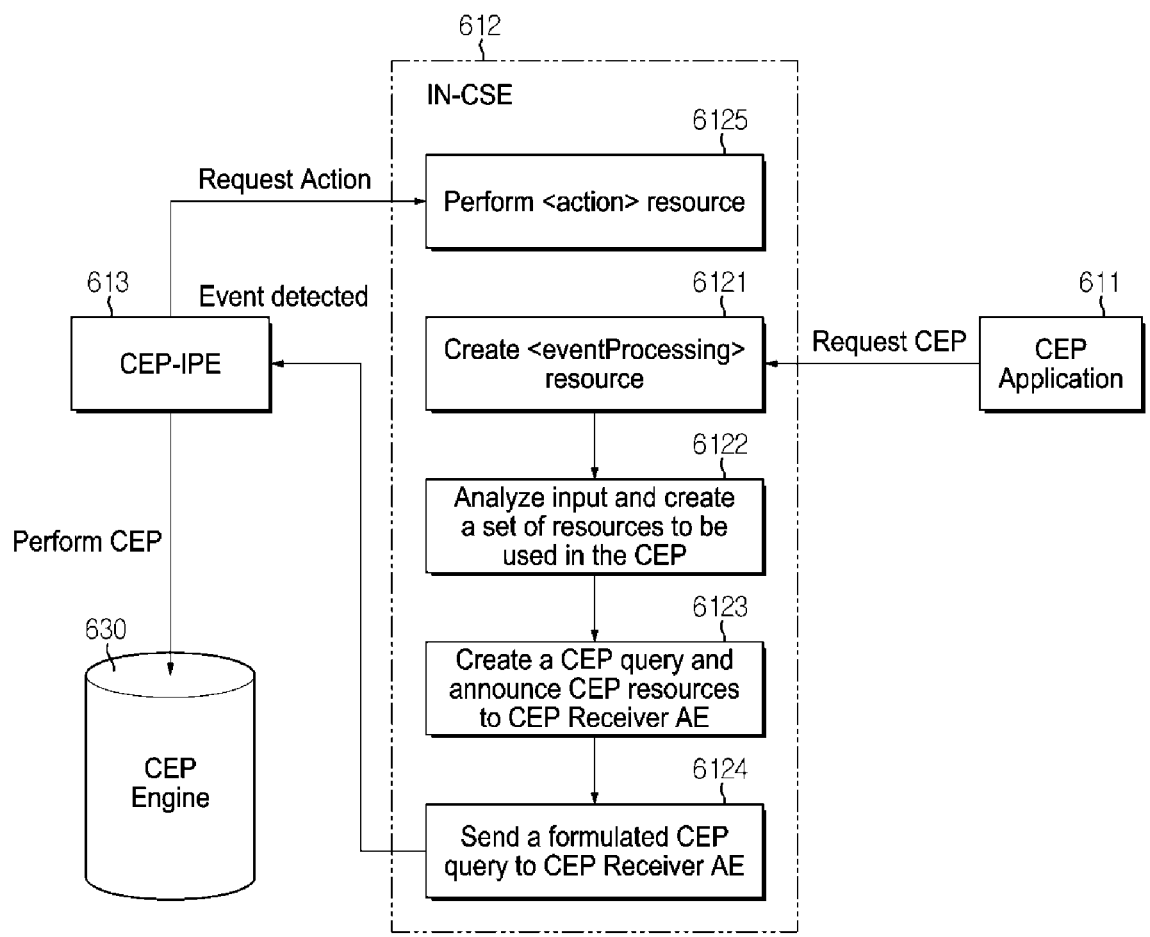

FIG. 6 and FIG. 7 shows examples of M2M system enabling CEP according to the present invention.

Referring to FIG. 6, an M2M system includes CEP IN-AE 611, IN-CSE 612 and CEP-IPE 613 in an infrastructure node (IN) 610. Also, an M2M system may include AE 620 (for example, a temperature sensor) as end node and CEP engine 630. Hereinafter, referring to FIG. 7, a CEP process in the M2M system will be described in detail.

First, the CEP IN-AE 611 transmits a request of CEP to the IN-CSE 612. For example, a complex event processing request may be set as follows. "For the same rack with an excessively high temperature, only if temperature events (for example, a temperature value exceeds 40° C.) occur successively within 10 seconds, the red LED light is triggered to be on." Particularly, the request may include the information described in Table 2 below.

TABLE 2

Target temperature resource
First event (the value of a target temperature resource is 40° C. and above)
Second event (the value of a target temperature resource is 40° C. and above)
Operators between the first event and the second event
Constraint of two consecutive events (that is, they occur within 10 seconds)

The IN-CSE 612 receiving the request, as described in FIG. 5, may create a corresponding CEP resource (6121). In addition, the IN-CSE 612 may analyze an input and create a set of resources to be used in the CEP (6122). For example, the IN-CSE 612 may create an <eventProcessing> resource. As mentioned above, the <eventProcessing> resource may include a <cepEngine> resource and an <eventRules> resource. Here, the <eventProcessing> resource, the <cepEngine> resource and the <eventRules> resource may be determined according to the request content of the CEP IN-AE 611.

In addition, the IN-CSE 612 creates a CEP query and announces the created CEP resources to a CEP receiver AE (for example, CEP-IPE) (6123). Next, the IN-CSE 612 sends a formulated CEP query to the CEP receiver AE (for example, CEP-IPE) (6124).

First, the CEP receiver AE, that is, CEP-IPE 613 may subscribe to a resource connected to CEP query and create an automatic rule for a designated CEP query. Next, CEP may be performed by using a CEP engine 630, and a CEP query and a related action may be connected by a link.

Particularly, when recognizing a matching event, the CEP-IPE 613 may notify the event and trigger a specific action. Thus, applying the above example, the CEP receiver 613 notifies an event (that is, two consecutive temperature values are 40° C. and above within 10 seconds) and triggers an operation (that is, action) of turning an LED light on in Room 1.

The IN-CSE receiving the action trigger request of the CEP-IPE 613 performs a corresponding action resource (6125).

The above process is expressed by a coded program in Table 3.

TABLE 3

Pattern<MonitoringEvent,?>warningPattern=
Pattern.<MonitoringEvent>begin("First Event")
.subtype(TemperatureEvent.class)
.where(evt->evt.getTemperature0>= TEMPERATURE_THRESHOLD)
.next("Second Event")
.subtype(TemperatureEvent.class)
.where(evt->evt.getTemperature0>= TEMPERATURE_THRESHOLD)
.within(Time.seconds(10));

In addition, the CEP-IPE 613, which is the CEP receiver AE, may subscribe to an <eventProcessing> resource in a serving CSE. More particularly, when one of events is updated, the CEP receiver AE may be updated. Then, the CEP receiver AE may update the corresponding automata rules.

Hereinafter, referring to FIGS. 8 to 12, an operation process for CEP will be described in detail.

Figure 8:
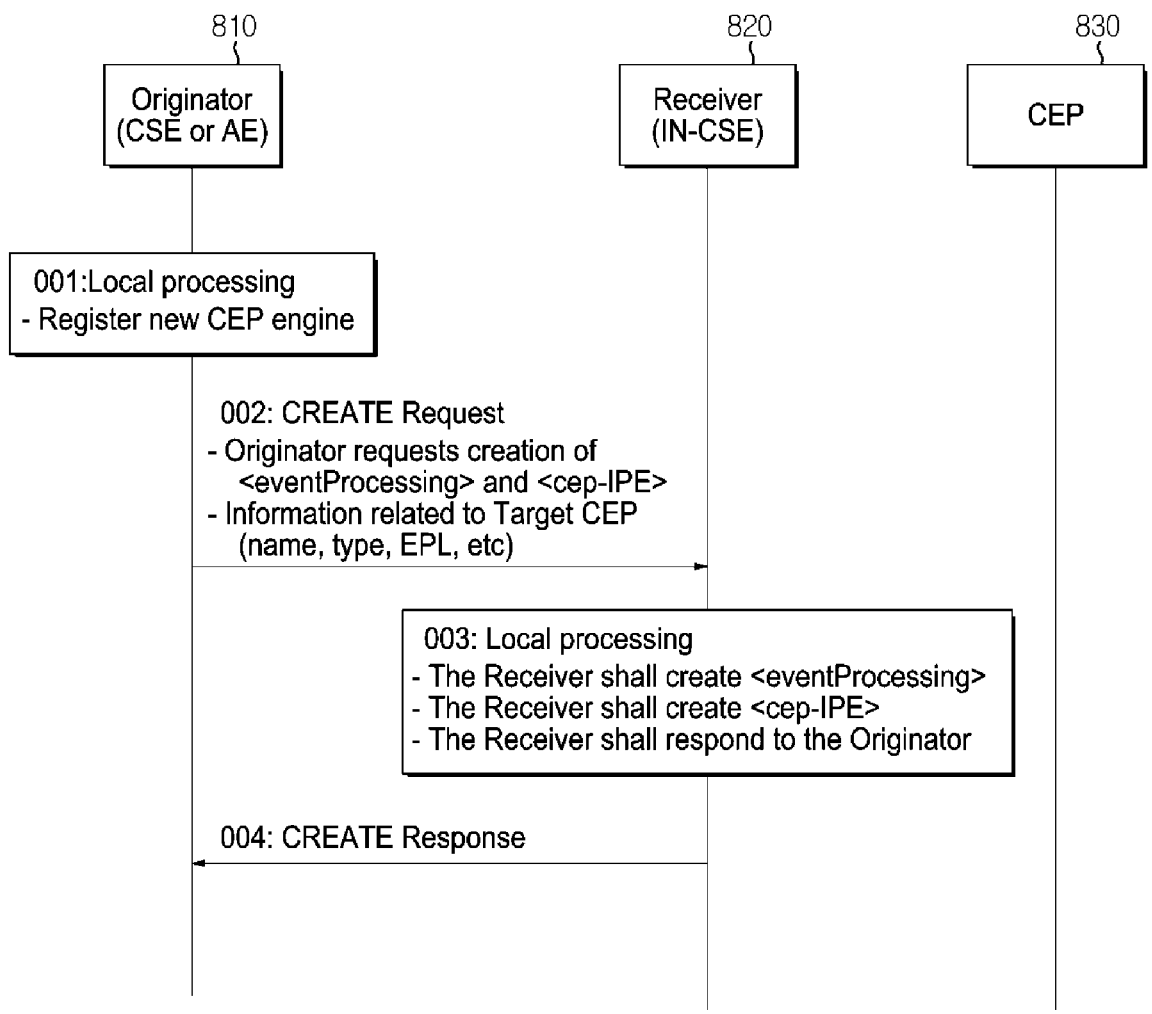
FIG. 8 shows an example of a process of creating CEP-related resources according to the present invention.

FIG. 8 shows an example of a process of creating CEP-related resources according to the present invention.

A resource creation requester (Originator) 810 registers a new CEP engine through internal processing (001). The resource creation requester (Originator) 810 may be CSE or AE. Then, the resource creation requester (Originator) 810 may request resource creation to a receiver 820 (for example, IN-CSE) (002). In this case, the resource creation requester 810 may request the creation of <eventProcessing> resource and <cep-IPE> resource (002). For this purpose, the resource creation requester 810 provides information related to a target CEP. For example, the information related to the target CEP may include information like the name of CEP, type and EPL.

A receiver 820 receiving the request creates the requested <eventProcessing> resource and <cep-IPE> resource through internal processing. In addition, the receiver 820 sends a response for a request to the resource creation requester 810 (003). The response may notify that the creation of the requested <eventProcessing> resource and <cep-IPE> resource is completed or the creation of the requested resources has not been performed (004).

Figure 9:
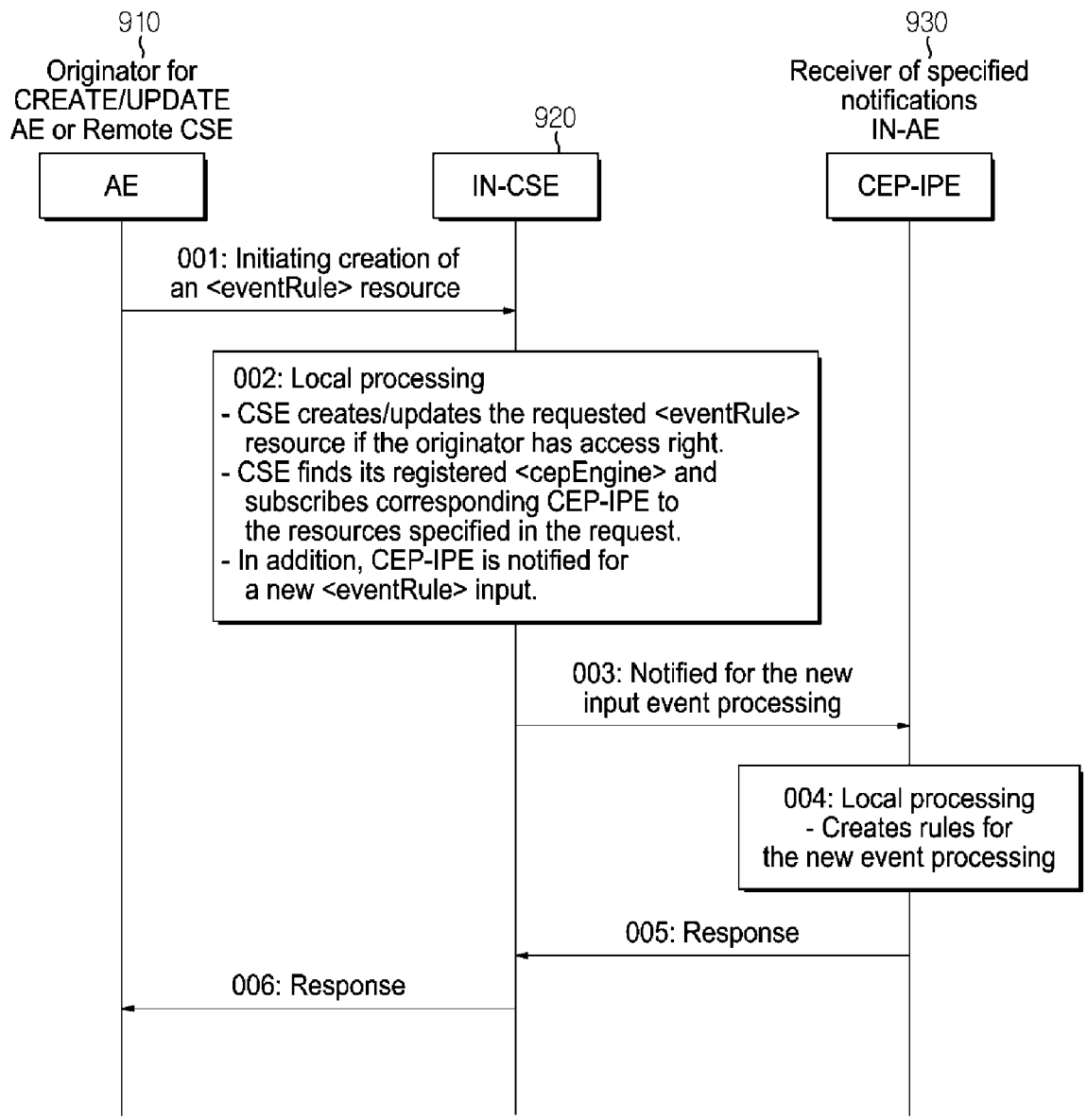
FIG. 9 shows an example of a process of creating and/or updating CEP <eventRult> resource according to the present invention.

FIG. 9 shows an example of a process of creating and/or updating CEP <eventRult> resource according to the present invention.

A resource creation or update requester (Originator) 910 may request the creation of an <eventRule> resource to IN-CSE 920 (001). The resource creation requester (Originator) 910 may be AE or remote CSE.

If the right of the resource creation requester (Originator) 910 is judged to be just, an IN-CSE 920 receiving the request creates or updates the requested <eventRule> resource (002). In addition, an IN-CSE 920 confirms a pre-registered <cepEngine> resource and subscribes a resource related to a corresponding request to a CEP-IPE 930 (002).

Next, the IN-CSE 920 notifies the existence of new event processing to the CEP-IPE 930 (003).

The CEP-IPE 930 receiving the request creates rules for the new event processing (004) and sends a corresponding result to the IN-CSE 920 as a response (005).

The IN-CSE 920 receiving the response sends a request result, that is, a response to the requester (Originator) 910, which is the first requester (006).

Figure 10:
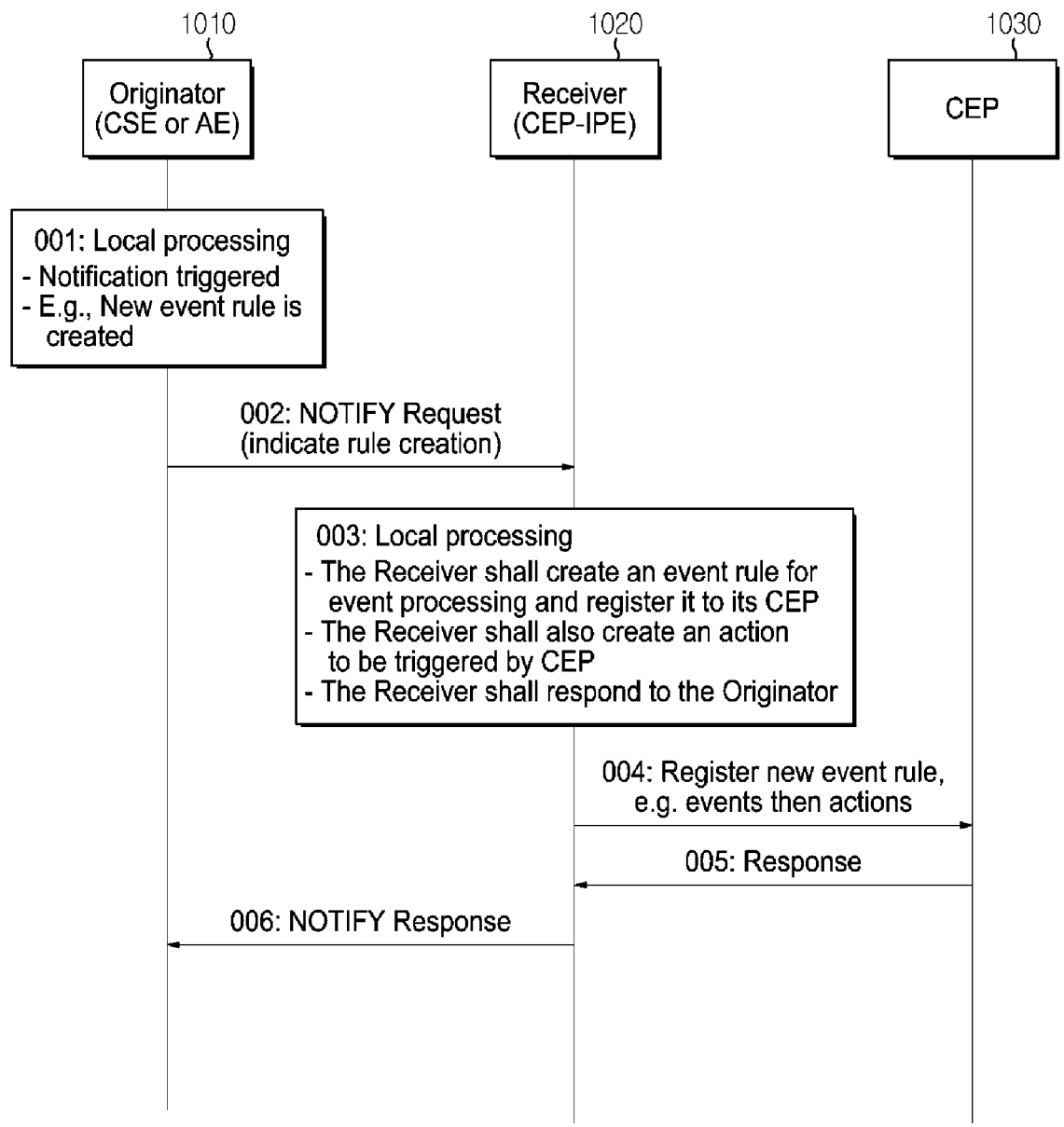
FIG. 10 shows an example of a process of notifying CEP <eventRule> resource according to the present invention.

FIG. 10 shows an example of a process of notifying CEP <eventRule> resource according to the present invention.

A resource notification requester (Originator) 1010, when a new CEP event rule needs to be created (001), notifies a request to a receiver 1020 through internal processing (002). Here, the resource notification requester (Originator) 1010 may be CSE or AE.

A receiver receiving the request (CEP-IPE) 1020 creates an event rule for event processing and registers it to CEP 1030 (003). In addition, the receiver (CEP-IPE) 1020 creates an action triggered by the CEP and registers it to the CEP 1030 as a new event rule. The event rule is a regularized process where an action is executed if a specific event occurs.

When an event rule is registered according to a request of the receiver (CEP-IPE) 1020, the CEP 1030 sends a response for it to the receiver (CEP-IPE) 1020 (005).

The receiver (CEP-IPE) 1020 receiving the response sends a notification request result (NOTIFY Response) to the requester (Originator) 1010, which is the first notification requester (006).

Figure 11:
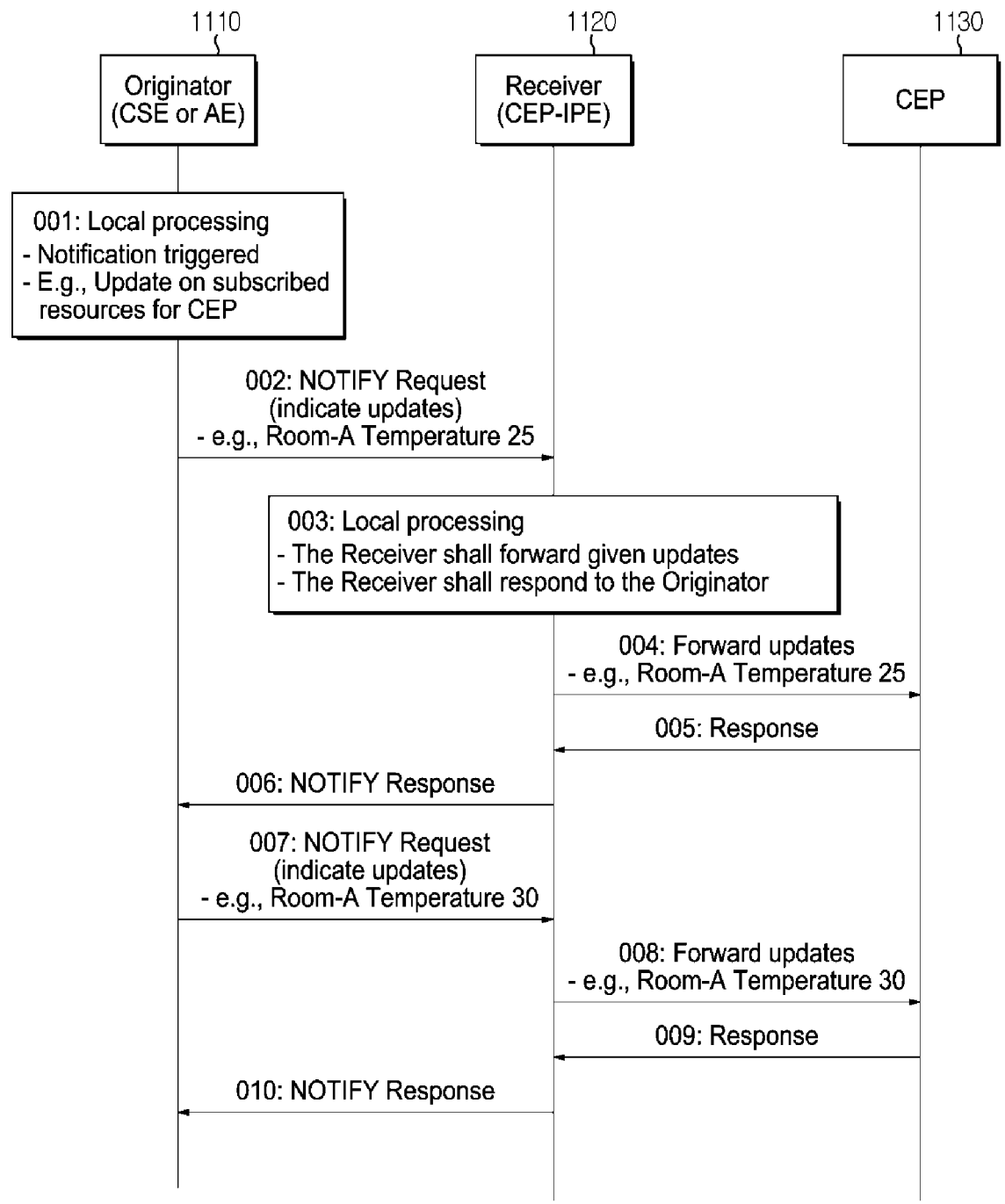
FIG. 11 shows an example of a process of notifying CEP event update according to the present invention.

FIG. 11 shows an example of a process of notifying CEP event update according to the present invention.

An update notification requester (Originator) 1110, when a new CEP event notification is necessary (001), notifies a notification request (NOTIFY Request) to a receiver 1120 through internal processing (002). For example, the new event notification may notify 'The temperature of Room A is 25° C.'. Here, the update notification requester (Originator) 1110 may be CSE or AE.

The receiver (CEP-IPE) 1120 receiving the request transmits the update request to CEP 1130 (004). When an event created according to the request of the receiver (CEP-IPE) 1120 is completely updated, the CEP 1130 sends a response for it to the receiver (CEP-IPE) 1120 (005).

The receiver (CEP-IPE) 1120 receiving the response sends an update request result (NOTIFY Response) as a response to the requester (Originator) 1010, which is the first update notification requester (006).

In this regard, when a new update event occurs (for example, 'The temperature of Room A is 30° C.'), the update requester (Originator) 1110 notifies update to a receiver (CEP-IPE) 1120 in the same manner (007), and the receiver (CEP-IPE) 1120 notifies the update of the new event (for example, 'The temperature of Room A is 30° C.') to the CEP 1130 (008). In addition, when the update is completed, corresponding responses are sequentially sent (009, 0010).

Figure 12:
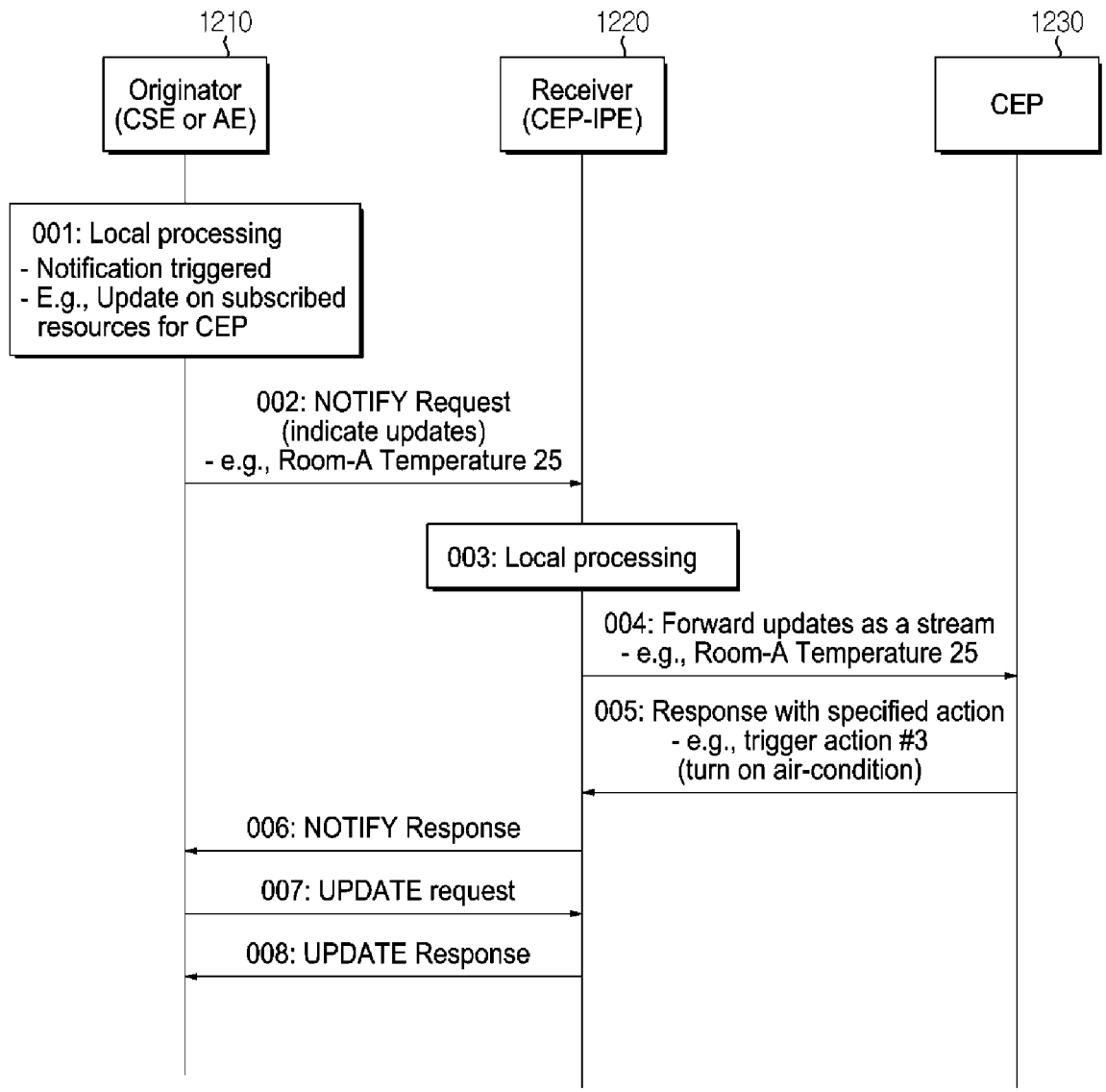
FIG. 12 shows an example of CEP action process according to the present invention.

FIG. 12 shows an example of CEP action process according to the present invention.

An update notification requester (Originator) 1210, when a new CEP event notification is necessary (001), notifies a notification request (NOTIFY Request) to a receiver 1220 through internal processing (002). For example, the new event notification may notify 'The temperature of Room A is 25', and this may be an update for a resource subscribed for CEP. Here, the update notification requester (Originator) 1110 may be CSE or AE.

The receiver (CEP-IPE) 1220 receiving the request transmits the update request (for example, 'The temperature of Room A is 25° C.') to CEP 1230 (004). If an event notified by the receiver (CEP-IPE) 1220 is judged to be an event for triggering a specific action, the CEP 1230 notifies the execution of the corresponding action to the receiver (CEP-IPE) 1220 (005). For example, the action may be an operation of turning on the air-conditioner of Room A. In this regard, the CEP 1230 may also directly update a resource corresponding to the action.

A receiver (CEP-IPE) 1220 receiving the notification may execute a corresponding action and send a corresponding result to the update notification requester (Originator) 1210 as a response (NOTIFY Response)(006). In addition, the receiver (CEP-IPE) 1220 may notify an update request to the update notification requester (Originator) 1210 (007) and receive an update response therefor (008). On the other hand, if the first response (NOTIFY Response, 006) is sent including an <action> resource so that the update notification requester (Originator) 1210 can manage an action trigger, the above-described update requesting and responding processes (007-008) may be omitted.

In this regard, CEP operators of the present invention may include various operators as shown in FIG. 15. In this regard, FIG. 15 shows one example of operators for CEP management. Operators are not limited to those shown in FIG. 15 but may be configured in diverse ways. For example, Atoms, Negation, Concatenation, Sequence, Iteration, Alternation, Timing, Parallelization and the like may be CEP operators.

FIG. 15 describes the concrete operations of the operators in detail. In particular, as the operators are used as CEP operators, it is self-evident that a CEP process of the present invention may become clearer. Accordingly, applicants propose the operators as CEP operators for an M2M system.

In addition, according to another embodiment, the above-described CEP resources of the present invention may also be applied to an M2M system by being defined as virtual resources. Herein, a virtual resource may include a CEP query for performing event processing when a corresponding resource receives a request. In addition, a virtual resource may perform event processing based on a specified query in the virtual resource, in order to confirm an intended input stream. In addition, a virtual resource may execute an action that is specified for a corresponding virtual resource.

For example, in an M2M platform, the virtual resource is considered to be similar to a general resource of a device. Accordingly, a virtual resource may be registered in an M2M platform as a resource that operates in the same manner as a general resource. Therefore, whenever creating a new business by using CEP, a service provider uses CEP first to create a virtual resource including a service logic for a new service. The virtual resource may have a CEP engine and an internal interface to perform complex event processing (CEP).

Figure 13:
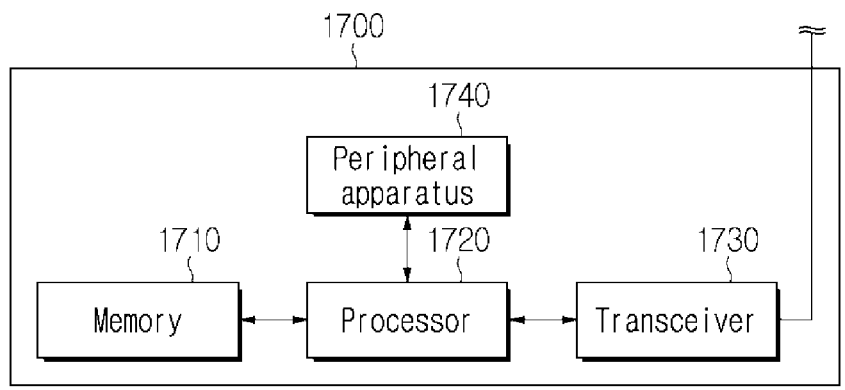
FIG. 13 and FIG. 14 are views illustrating an example of CEP managing apparatus configuration according to the present invention.

FIG. 13 is a view illustrating an example of CEP managing apparatus configuration according to the present invention. Referring to FIG. 13, a device 1700 may include a memory 1710, a processor 1720, a transceiver 1730 and a peripheral apparatus 1740. In addition, for example, a device 1700 may further include another configuration and is not limited to the above-described embodiment. Herein, for example, a device may be an apparatus operating based on the above-described M2M system. More specifically, the device of FIG. 13 may be an illustrative hardware/software architecture of an M2M network node such as an M2M device, an M2M gateway and an M2M server. In this case, for example, a memory 1710 may be a non-removable memory or a removable memory. In addition, for example, a peripheral apparatus 1740 may include a display, GPS or other peripherals and is not limited to the above-described embodiment. In addition, for example, the above-described device 1700 may be a node. Here, like a transceiver 1730, the node may include a communication circuit. Based on this, the node may perform communication with an external device.

In addition, for example, a processor 1720 may be at least one or more among a general-purpose processor, a DSP (Digital Signal Processor), a DSP core controller, a micro controller, ASICs (Application Specific Integrated Circuits), FPGA (Field Programmable Gate Array) circuits, any other type of IC (Integrated Circuit), and one or more microprocessors related to a state machine. In other words, it may be a hardware/software configuration playing a controlling role for controlling the above-described device 1700. Here, the processor 1720 may execute computer-executable commands stored in the memory 1710 in order to implement various necessary functions of node. For example, the processor 1720 may control at least any one operation among signal coding, data processing, power controlling, input and output processing, and communication. In addition, the processor 1720 may control a physical layer, a MAC layer and an application layer. In addition, for example, a processor 1720 may execute an authentication and security process in an access layer and/or an application layer and is not limited to the above-described embodiment.

In addition, for example, a processor 1720 may perform communication with other devices through a transceiver 1730. For example, a processor 1720 may execute computer-executable commands so that a node can be controlled to perform communication with other nodes through a network. In other words, communication performed in the present invention may be controlled. For example, other nodes may be an M2M gateway, an M2M server and other devices. For example, a transceiver 1730 may send a RF signal through an antenna. It may send a signal based on various communication networks. In addition, for example, MIMO technology and beam forming technology may be applied as antenna technology, which are not limited to the above-described embodiment. In addition, a signal transmitted and received through a transceiver 1730 may be controlled by a processor 1720 by being modulated and demodulated, which is not limited to the above-described embodiment.

Figure 14:
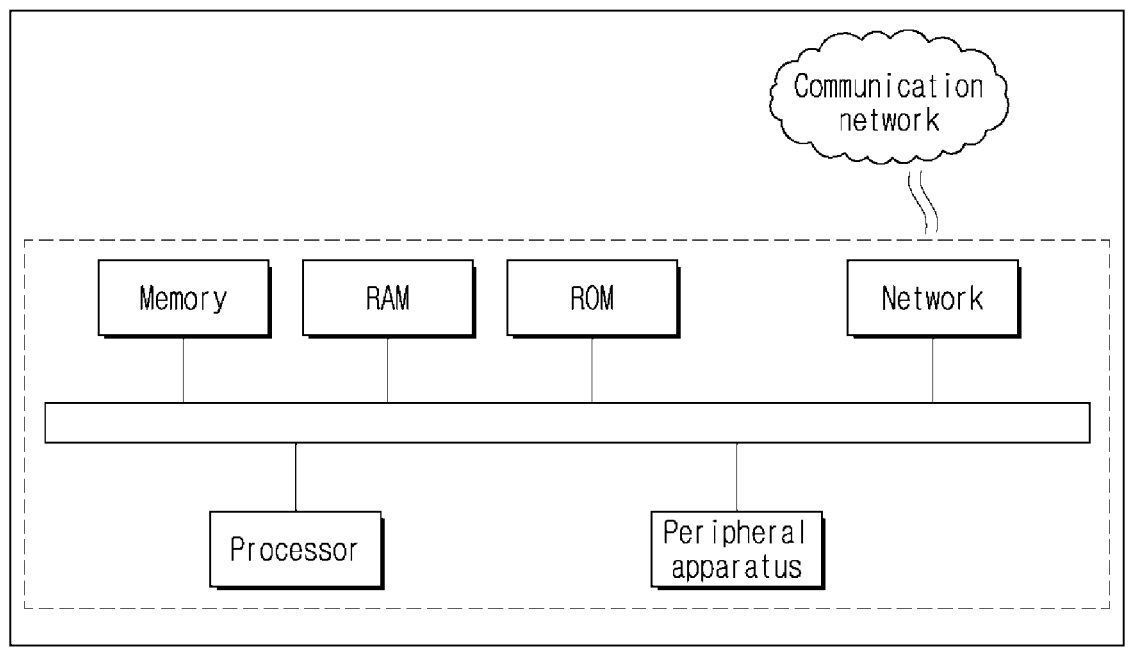

FIG. 14 may be another apparatus configuration for a device. Referring to FIG. 14, as described above, it may be controlled by a processor. Herein, for example, a memory, RAM, ROM and a network may be included. In addition, another movable memory may be further included and is not limited to the above-described embodiment. Herein, a processor may be controlled to execute a command based on information stored in the above-described memories and to perform the operations described in the present invention. In addition, a processor may be provided with power by a power supply and be offered input information by peripherals, which is not limited to the above-described embodiment. In addition, for example, a device may obtain location information and related information based on GPS and the like. In addition, for example, a device may receive input information based on other input devices and is not limited to the above-described embodiment.

The above-described embodiments of the present invention may be implemented by various means. For example, the embodiments of the present invention may be implemented by hardware, firmware, software, or a combination thereof.

The foregoing description of the preferred embodiments of the present invention has been presented for those skilled in the art to make and use the invention. While the foregoing description has been presented with reference to the preferred embodiments of the present invention, it will be apparent to those skilled in the art that various modifications and variations can be made in the present invention without departing from the spirit or scope of the present invention as defined by the following claims. Accordingly, the present invention is not intended to be limited to the embodiments shown herein but is to be accorded the widest scope consistent with the principles and novel features disclosed herein. In addition, while the preferred embodiments of the present specification have been particularly shown and described, it is to be understood that the present specification is not limited to the above-described embodiments, but, on the contrary, it will be understood by those skilled in the art that various changes and modifications can be made without departing from the spirit and scope of the present specification as defined by the claims below, and such changes and modifications should not be individually understood from the technical thought and outlook of the present specification.

In this specification, both the invention and the method invention are explained, and the description of both inventions can be supplemented as necessary.

In addition, the present invention has been described with reference to preferred embodiments thereof. It will be understood by those skilled in the art that various changes in form and details may be made therein without departing from the essential characteristics of the present invention. Therefore, the disclosed embodiments should be considered in an illustrative rather than a restrictive sense. The scope of the present invention is defined by the appended claims rather than by the foregoing description, and all differences within the scope of equivalents thereof should be construed as being included in the present invention.

What is claimed is:

1. A complex event processing (CEP) managing method, the method comprising:
   receiving a CEP request,
   setting an event processing resource including a CEP query responding to the CEP request, and
   when an event corresponding to the event processing resource occurs,
   triggering a corresponding action,
   wherein the action is managed by a preset event rule,
   wherein the CEP query is created by analyzing the CEP request and is represented by an event processing language, and
   wherein whether the event corresponding to the event processing resource occurs or not is determined based on the CEP query.

2. The method of claim 1,
   wherein the event processing resource comprises an event engine resource.

3. The method of claim 1,
   wherein the event rule is defined by an event rule resource in the event processing resource.

4. The method of claim 1, comprising:
   for the action trigger, a CEP interworking resource comprising trigger action information based on CEP.

5. The method of claim 4,
   wherein the CEP interworking resource comprises a CEP event resource and a CEP action resource.

6. A complex event processing (CEP) managing apparatus, the apparatus comprising:
   at least one or more processors and
   at least one or more memories connected to the at least one or more processors,
   wherein the at least one or more processors, which are connected to the at least one or more memories in an operable manner and execute a program command stored in the at least one or more memories,
   receive a CEP request,
   set an event processing resource including a CEP query responding to the CEP request, and
   when an event corresponding to the event processing resource occurs, trigger a corresponding action,
   wherein the action is managed by a preset event rule,
   wherein the CEP query is created by analyzing the CEP request and is represented by an event processing language, and
   wherein whether the event corresponding to the event processing resource occurs or not is determined based on the CEP query.

7. The apparatus of claim 6,
   wherein the at least one or more processors set an event engine resource in the event processing resource.

8. The apparatus of claim 6,
   wherein the at least one or more processors set an event rule resource in the event processing resource and hence manage the event rule.

9. The apparatus of claim 6,
   wherein, for the action trigger, the at least one or more processors set a CEP interworking resource comprising trigger action information based on CEP.

10. The apparatus of claim 9,
    wherein the at least one or more processors set a CEP event resource and a CEP action resource in the CEP interworking resource.

11. An M2M system for CEP (Complex Event Processing) management, the system comprising:
    an application entity (AE) node requesting CEP management,
    a common service entity (CSE) node setting a CEP resource including a CEP query responding to the CEP management request, and
    a CEP-IPE node triggering a corresponding action, when an event corresponding to the CEP resource occurs,
    wherein the common service entity (CSE) executes an action triggered from CEP-IPE,
    wherein the CEP query is created by analyzing the CEP request and is represented by an event processing language, and
    wherein whether the event corresponding to the event processing resource occurs or not is determined based on the CEP query.

12. The system of claim 11,
    the CEP resource comprises an event processing resource and an event engine resource.

13. The system of claim 11,
    wherein the CEP resource, for the action trigger, comprises a CEP interworking resource comprising trigger action information based on CEP.

14. The system of claim 13,
    wherein the CEP interworking resource comprises a CEP event resource and a CEP action resource.

* * * * *